US012655949B2

(12) United States Patent　　　　(10) Patent No.:　US 12,655,949 B2

Valdez et al.　　　　　　　　　　　　(45) Date of Patent:　Jun. 16, 2026

(54) LIGHT PIPE FOR LED MOUNTED CIRCUIT BOARD

(71) Applicant: Bivar, Inc., Irvine, CA (US)

(72) Inventors: Angelito Valdez, Anaheim, CA (US); Kurt Baron, Mission Viejo, CA (US)

(73) Assignee: BIVAR, INC., Irvine, CA (US)

( * ) Notice: Subject to any disclaimer, the term of this patent is extended or adjusted under 35 U.S.C. 154(b) by 0 days.

(21) Appl. No.: 18/984,854

(22) Filed: Dec. 17, 2024

(65) Prior Publication Data

US 2025/0198575 A1　　　Jun. 19, 2025

Related U.S. Application Data

(60) Provisional application No. 63/611,900, filed on Dec. 19, 2023.

(51) Int. Cl.

| *F21K 9/61* | (2016.01) |
|---|---|
| *F21V 8/00* | (2006.01) |
| *F21V 23/00* | (2015.01) |
| *F21V 31/00* | (2006.01) |
| *F21Y 115/10* | (2016.01) |

(52) U.S. Cl.

CPC .............. *F21K 9/61* (2016.08); *F21V 23/005* (2013.01); *F21V 31/005* (2013.01); *G02B 6/0096* (2013.01); *F21Y 2115/10* (2016.08)

(58) Field of Classification Search

CPC ........ F21K 9/61; F21V 23/005; F21V 31/005; G02B 6/0096; F21Y 2115/10

See application file for complete search history.

(56) References Cited

U.S. PATENT DOCUMENTS

| 4,626,034 | A | * | 12/1986 | Breuer | .................... | E21C 35/19 |
|---|---|---|---|---|---|---|
|  |  |  |  |  |  | 299/108 |
| 4,802,725 | A | * | 2/1989 | Borne | .................. | G02B 6/4248 |
|  |  |  |  |  |  | 385/88 |
| 4,814,948 | A | * | 3/1989 | Hasegawa | ............ | G02B 6/4298 |
|  |  |  |  |  |  | 362/455 |
| 5,434,407 | A | * | 7/1995 | Bauer | .................... | B60R 1/088 |
|  |  |  |  |  |  | 250/227.24 |

(Continued)

FOREIGN PATENT DOCUMENTS

| CA | 2873065 | A1 | * | 12/2013 | ................ | A61P 1/02 |
|---|---|---|---|---|---|---|
| JP | 11142653 | A |  | 5/1999 |  |  |
| JP | 4601651 | B2 | * | 12/2010 |  |  |

OTHER PUBLICATIONS

English translation of Takeda JP-4601651-B2 (Year: 2010).*

*Primary Examiner* — Evan P Dzierzynski

(74) *Attorney, Agent, or Firm* — ONE LLP

(57)　　　　　　　ABSTRACT

A light pipe assembly is provided which complies with the International Electrotechnical Commission (IEC) IP ratings for dirt and water ingress while reducing the amount of hardware typically required to mount each light pipe. The light pipe assembly includes a light pipe and an adapter. Each adapter includes a vertically extending center channel which receives and connects a light pipe's first end to an LED mounted upon a printed circuit board (PCB). Each light pipe is intended to project through the hole of an electronic device's panel. Furthermore, each light pipe's second end has flange and a press-fit region, preferably in the form of circumferential ribs, which forms a press-fit engagement with a panel.

6 Claims, 5 Drawing Sheets

(56)  References Cited

U.S. PATENT DOCUMENTS

| | | | |
|---|---|---|---|
| 6,302,595 B1 | 10/2001 | Vilgiate et al. | |
| 7,708,586 B1 * | 5/2010 | Rohde ................... | H01R 13/746 |
| | | | 439/490 |
| 9,688,191 B2 | 6/2017 | Bravo Solis et al. | |
| 2013/0135890 A1 * | 5/2013 | Jing ..................... | G02B 6/0006 |
| | | | 29/595 |
| 2014/0293642 A1 * | 10/2014 | Meng ................... | H10H 20/855 |
| | | | 362/555 |
| 2015/0288069 A1 * | 10/2015 | Falk ....................... | H01Q 1/225 |
| | | | 333/248 |
| 2015/0316711 A1 | 11/2015 | North | |
| 2024/0053525 A1 * | 2/2024 | Valdez ................. | G02B 6/0008 |

* cited by examiner

LIGHT PIPE FOR LED MOUNTED CIRCUIT BOARD

CROSS-REFERENCE TO RELATED APPLICATIONS

The present application claims priority U.S. Provisional Patent Application Ser. No. 63/611,900 filed on Dec. 18, 2023, which is incorporated herein by reference.

BACKGROUND OF THE INVENTION

The present invention relates light pipes connected to one or more light emitting diodes (LEDs) mounted upon a printed circuit board (PCB).

With reference to FIGS. 1-2, often it is necessary to mount visual indicators such as LEDs 5 on a PCB 3. The LEDs 5 can be mounted on the PCB 3 to indicate any number of conditions including an indication of power, a processing condition, or an indication that an error in transmitting the signals has occurred. The number of LEDs 5 upon a PCB's surface varies depending on engineering and design requirements with the number of LEDs limited by the size of the PCB.

The LED visual indication must oftentimes be transmitted to the exterior (also referred to herein as the front side) of the panel 9 of an electronic device, such as a computer server. The transmission of light is accomplished using a light pipe 15 which includes a first end 17 positioned adjacent to an LED 5, and a second end 19 that extends through a hole 11 in the panel 9 which forms the exterior of the electronic device. The traditional light pipe 15 is made of a relatively hard translucent plastic, such as polycarbonate or acrylic. As an example, a traditional light pipe made of polycarbonate has a Shore D hardness value between 90 to 95, or a light pipe made of the acrylic polymethylmethacrylate has a Shore D hardness value of between 90 to 99. These are hard, brittle plastics that are not significantly deformable without breaking.

There are a variety of apparatus for connecting the first end 17 of a light pipe 15 to a PCB adjacent to the LED 5. Typically, a first end of a light pipe is affixed to a PCB using an adapter 51. An adapter 51 is typically hollow for receiving the light pipe's end, and the adapter includes one or more pins 53 which form a press fit engagement with holes 7 formed in the PCB to affix the adapter and light pipe in place.

As illustrated in Gigs. 1-2, for a front mounted Ingress Protected ("IP") rated light pipe, the light pipe's second end 19 is typically affixed to the panel 9 using hardware including a gasket 22, lock washer 27 and a nut 29. The traditional IP rated light pipe 15 typically includes male threads 25, adjacent to the light pipe's second end 10, that project through panel's hole 11. To affix the second end 19 of the light pipe to the panel, the second end of the light pipe 15 is first fed through a panel's hole 11 from the exterior side of the panel. Because the light pipe is made of a hard plastic, the light pipe's male threads 25 must have a diameter smaller than a corresponding panel's hole's diameter to allow the threads 25 to pass through the hole 11 without interference. For a front mounted light pipe 15, the light pipe has an end radially extending flange 21 that is too large to pass through the hole so that the flange engages the panel.

The gasket 22 is typically made of polyurethane and is positioned between the flange 21 and panel 9. The gasket 22 is intended to provide an IP67 rated waterproof protection against the ingress of water or dirt into the electronic device.

The IP67 rating, which was developed by the International Electrotechnical Commission (IEC), is incorporated by reference herein. The "IP" within IP67 stands for "Ingress Protection", and the IP is followed by two digits wherein the first digit represents how well a product protects against solids, and the second digit represents how well it protects against liquids in varying volumes, pressures, and temperatures.

To affix the light pipe's second end to the panel 9, the lock washer 27 and nut 29 are fed onto the opposite first end 17 of the light pipe and moved toward the light pipe's second end 19 until they engage the threads. The nut is then tightened until engaging the panel, and then further tightened to a specific torques both to lock the light pipe's second end in place, and compress the gasket 22 to provide the desired waterproof seal.

Unfortunately, the light pipes require hardware (including a gasket, lock washer, and nut) to affix the ends of one or more light pipes to an electronic device's panel. This hardware adds unwanted cost to the assembly.

Also unfortunately, the installation of the hardware is unnecessarily time-consuming and requires specific tools and knowledge to properly torque the nut and compress the gasket to comply with the IP67 rating.

Thus, there is a need for a new construction for mounting the ends of light pipes to a panel that is less expensive.

There is also a need for a new construction for mounting the ends of light pipes to an electronic device's panel that is simpler and less time-consuming.

SUMMARY OF THE INVENTION

The present invention addresses the aforementioned disadvantages by providing an improved light pipe and an improved light pipe assembly. The light pipe assembly includes a printed circuit board having at least one surface mounted LED. The light pipe assembly also includes a panel of an electronic device, such as a computer server. The panel includes one or more holes corresponding to the number of LEDs on the printed circuit board. To transmit light from the LED to the panel, the light pipe assembly includes at least one flexible light pipe which extends from the printed circuit board LED to the panel. Finally, the light pipe assembly includes an adapter which affixes a first end of the light pipe to the circuit board adjacent to an LED.

The adapter may be constructed in various shapes and sizes. However, a preferred adapter has a top, a bottom and four sides. The adapter further includes a center channel which extends from the adapter's top to its bottom. The channel's bottom has a shape that forms a receptacle to accept one of the LEDs which is surface mounted upon the printed circuit board, preferably but not necessarily, in a press-fit engagement. Conversely, the top of the adapter's channel has a shape which forms a light pipe receptacle to receive the light pipe's first end. As would be understood by those skilled in the art, the terms "top" and "bottom" are meant for reference purposes only as the orientation of the printed circuit board, and in turn an adapter, may orient the adapter's top to be below the adapter's bottom.

The light pipe has a first end that engages the printed circuit board adjacent to an LED and a second end that engages the electronic devices panel. Between the light pipe's first end and second end, the light pipe has an intermediate section that has a diameter which is smaller than the panel's hole. The diameter of the light pipe's intermediate section being smaller than the panel's hole allows the light pipe to be installed within the assembly by feeding the light pipe's first end and intermediate section through the panel's hole until the light pipe is predominantly within the electronic device, and the light pipe's first end extends to an LED.

The light pipe's first end is sized and shaped to reside within and form a press-fit engagement within the adapter's light pipe receptacle. The light pipe's first end may be constructed in various shapes. However, it is preferred that the light pipe's first end have a generally four-sided shape so as to form a press-fit engagement within the adapter's light pipe receptacle, which in turn, preferably has a square cross-section.

Meanwhile, the light pipe's second end includes a flange which remains adjacent to the exterior side of the panel. In addition, the flange has a diameter larger than the panel's hole, and the flange is preferably too large to be easily deformed to pass through the panel's hole. In addition, the light pipe includes one or more deformable ribs adjacent to the flange. Preferably, the ribs are small enough so that they can be manually pushed through a panel's hole, but the ribs are larger than a corresponding panel's hole so as to facilitate a press-fit engagement with the light pipe's first end.

The light pipe may be made of various materials. However, the light pipe is preferable made of a material which is sufficiently flexible to allow it to be bent into various configurations, and sufficiently flexible for its first and second ends to form stable press-fit engagements that are not susceptible to disengagement such as from vibration.

Other features and advantages of the present invention will be appreciated by those skilled in the art upon reading the detailed description, which follows with reference to the Drawings.

DETAILED DESCRIPTION OF THE INVENTION

Figure 1:
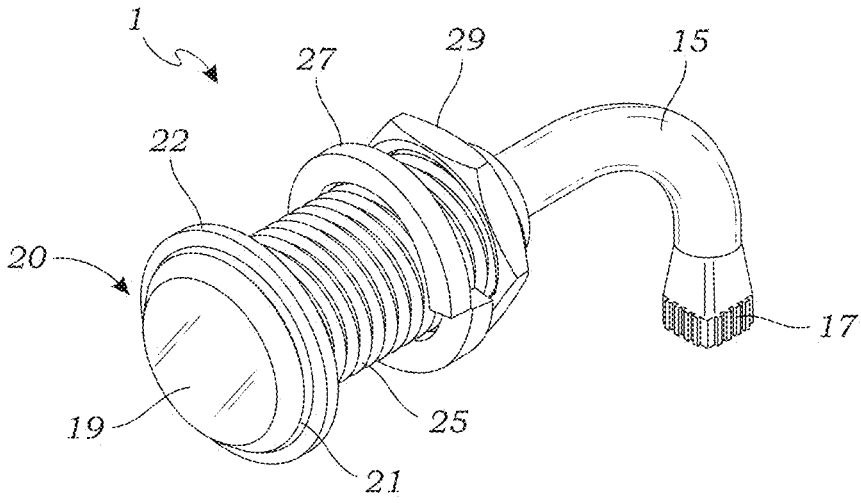
FIG. 1 is a perspective view of a prior art light pipe and mounting hardware.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

The present invention addresses the aforementioned disadvantages by providing an improved light pipe 15. With reference to FIGS. 1-17, visual indicators in the form of LEDs 7 are oftentimes mounted upon a printed circuit board 5. Light emitted from the LEDs 5 is transmitted through light pipes 15 to the exterior of an electronic device. To this end, the light pipes 15 include a first end 17 which is intended to be positioned adjacent to an LED 5. Meanwhile, the light pipes 15 pass through holes 11 in an electronic device's panel 9 so as to position the light pipes' second ends 19 on the panel's exterior side so as to be seen by individuals who are viewing the second ends 19 of the light pipes 19. Light pipes 15 typically take one of two forms of either a front mounted light pipe 15, or a rear mounted light pipe (not shown). With reference to FIGS. 1-17, a front mounted light pipe 15 includes a flange 21 which is intended to be positioned adjacent the exterior (front) side of a panel 9.

Figure 2:
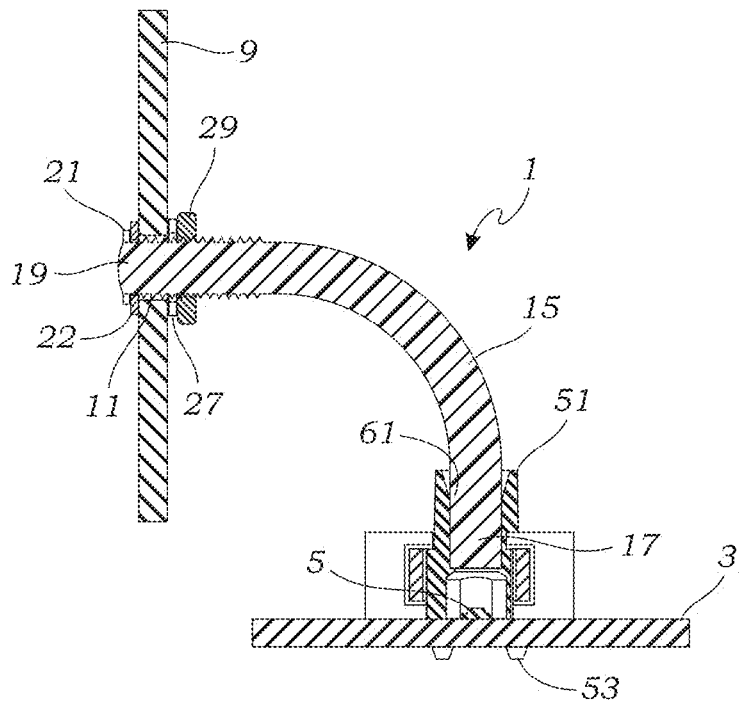
FIG. 2 is a side cross-sectional view showing a prior art light pipe connecting an electronic device's panel and a printed circuit board employing the prior art mounting hardware shown in FIG. 1.
Figures 3, 4, 5, 6, 7, 8:
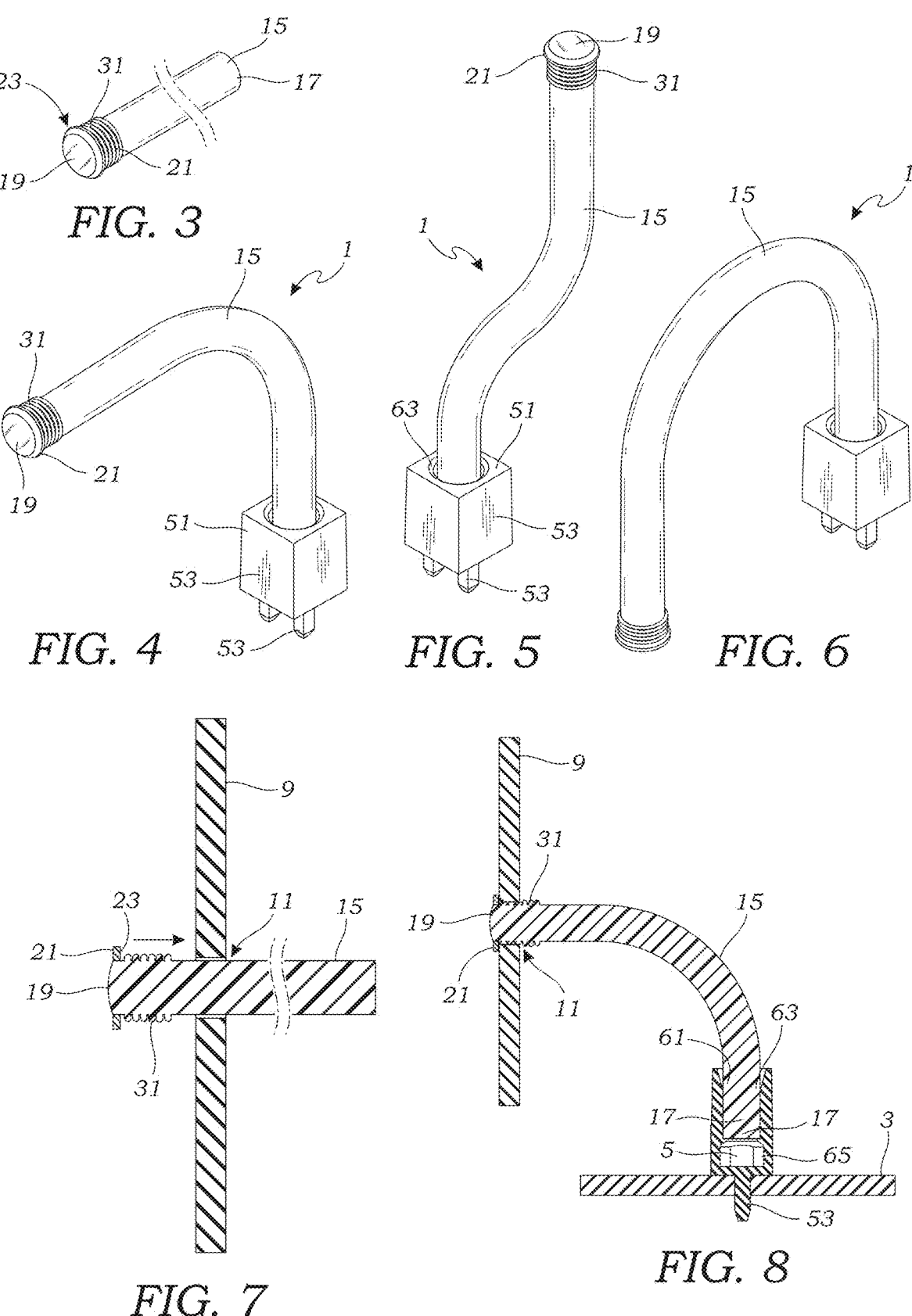
FIG. 3 is a perspective view of a light pipe of the present invention.
FIG. 4 is a perspective view of a light pipe and adapter of the present invention wherein the light pipe has been bent 90°.
FIG. 5 is a perspective view of a light pipe and adapter of the present invention wherein the light pipe has been bent twice.
FIG. 6 is a perspective view of a light pipe and adapter of the present invention wherein the light pipe has been bent 180°.
FIG. 7 is a side cross-sectional view showing a light pipe of the present invention be fed through a hole formed in an electronic device panel.
FIG. 8 is a side cross-sectional view showing a light pipe of the present invention extending through a panel hole with a 90° bend to an adapter and LED.

With reference to all of the Figures, but primarily to FIGS. 2, 4-6, and 8-17, the light pipe assembly 1 includes one or more adapters 51. Each adapter 51 has four sides 55 and a center channel 61. As seen in FIGS. 2 and 8, each adapter's center channel 61 includes a light pipe receptacle 63 which is sized to receive and provide a press-fit engagement to the light pipe's first end 17. The light pipe's first end 17 may be constructed so as to have various shapes. However, it is preferred that the light pipe's first end 17 have a generally square shape so as to form a press-fit engagement within the adapter's light pipe receptacle 63 which also preferably has a square shape. The light pipe's receptacle 63 may include deformable ridges so as to facilitate a press-fit engagement with the light pipe's first end 17.

As best seen in FIGS. 2, 4-6, and 8-17, each adapter's center channel 61 further includes an LED receptacle 65 which is sized and positioned to receive a PCB's LED 5. As would be understood by one skilled in the art, the adapters 51 are constructed so that an LED is positioned and maintained adjacent to the first end 17 of a light pipe 15. The adapters 51 may also be made or various materials, but are preferably made of plastic, with a preferred material being Nylon 6/6, UL94V-0, black.

With reference particularly to FIGS. 2 and 8-17, the light pipe assembly 1 (including light pipe 15 and adapter 51) is affixed to an underlying PCB 3 with an adapter 51 positioned immediately above each LED 5. The light pipe assembly 1 may be affixed to the PCB 3 by various connector constructions as can be determined by those skilled in the art such as using a simple adhesive. However, in a preferred embodiment, the adapters 51 include one or more pins 53 which project downwardly in a press-fit engagement to holes formed in the PCB 3.

Meanwhile, the light pipes' second ends 19 have been positioned to project through the holes 11 of an electronic device panel 9 so that the second ends 19 of the light pipes can be visible. The light pipes' second ends 19 can be constructed as can be determined by one skilled in the art. However, it is preferred that the light pipe's second ends 19 be constructed so as to have a traditional rear mount construction including a flange 21 having an abutment side 23 that is intended to abut against the rear side of a device's panel 9.

With reference to 3-17, unlike traditional light pipes made of polycarbonate, the preferred light pipe 15 is made of a flexible durable material having high luminous transmittance, low chromatic dispersion, and low haze and scatter. Preferred materials have a Shore A hardness of below 120. Even more preferably, the light pipe is made of flexible material having a Shore A hardness of between 40 and 100. Even more preferably, the light pipe is made of flexible material having a Shore A hardness of between 80 and 90. Typical silicone plastics having a Shore A of below 32 are not considered acceptable for use as a light pipe. However, an acceptable material for use as a light pipe includes polydimethylsiloxane having a Shore A hardness of 86 sold under the trademark Silastic™ MS-4002 by Dow Chemical Company. Other Dow Chemical Company Silastic™ polydimethylsiloxane products are also acceptable materials for fabricating the light pipe 15 including those designated by specification nos. MS-1002, MS-1003 and MS-4007. Each of these specifications is incorporated by reference herein. Clear silicone products from other manufacturers may also be employed in the manufacture of the light pipe.

Also preferably, the light pipe 15 having a intermediate section which extends from its first end 17 toward its second end 19. This intermediate section of light pipe from the light pipe's first end to the light pipe's second end has a diameter smaller than a panel's hole 11 so that the light pipe's first end 15 can be fed through the panel's hole 11 to the PCB's LED 7 and corresponding adapter 51. However, the light pipe 15 includes a press-fit region 31 near the light pipe's second end 17 where the light pipe's diameter is larger than the hole's diameter. However, this press-fit region 31 has a diameter smaller than the diameter of the flange 21 as the flange acts as a stop to prevent the light pipe's second end from passing through the hole into the device's interior. Preferably, and as illustrated in FIGS. 3-17, this press-fit region 31 is constructed to include circumferential ribs 31 that have a diameter larger than the panel's hole 11; however, the interstitial spaces between the ribs 31 may, or may not, have a diameter larger than the diameter of the panel's hole 11. As illustrated in FIGS. 7 and 8, preferably, the ribs 31 and interstitial spaces between the ribs are sufficiently small that at least one rib resides entirely within the hole 11. For example, in the preferred embodiment illustrate FIGS. 7 and 8, two ribs reside in the panel's hole 11 and a third rib extends partially into the interior of the electronic device to seal the interior side of the panel 9.

This press-fit region 31 is intended to reside within the panel's hole 11. However, due to the light pipe 15 being made of flexible material, the ribs 31 can deform to enter into the hole 11, and thereafter, form a press-fit attachment to the panel 9. Constructions other than circumferential ribs may be employed to form a press fit engagement between the light pipe 15 and panel 9. However, the circumferential ribs 31 are a preferred construction.

Advantageously, the press-fit engagement between the light pipe ribs and panel hole 11 provides a watertight seal that complies with the IP67 rating.

Figure 9:
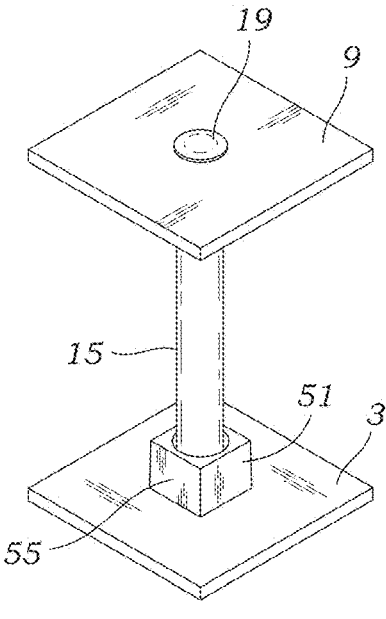
FIG. 9 is a perspective view of an electronic panel, light pipe assembly including adapter and printed circuit board.
Figure 10:
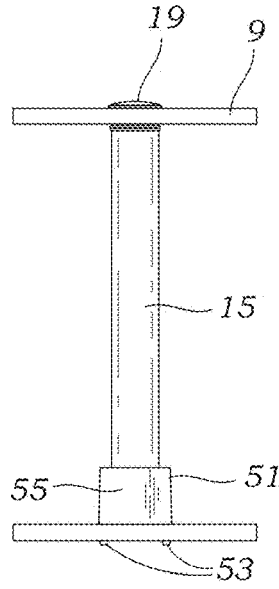
FIG. 10 is a side view of an electronic panel, light pipe assembly including adapter and printed circuit board shown in FIG. 9.
Figure 11:
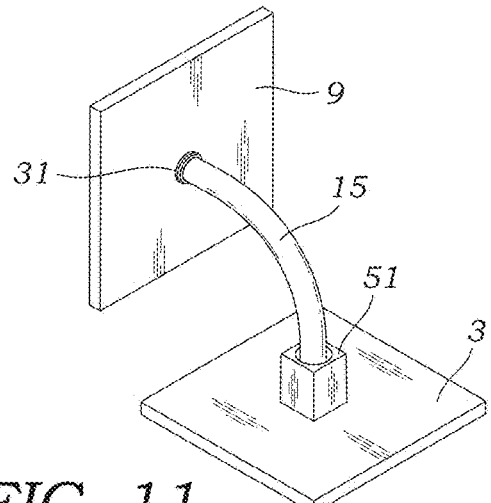
FIG. 11 is a rear perspective view of an electronic panel, light pipe assembly (including a light pipe with a 90° bend and an adapter), and printed circuit board.
Figure 12:
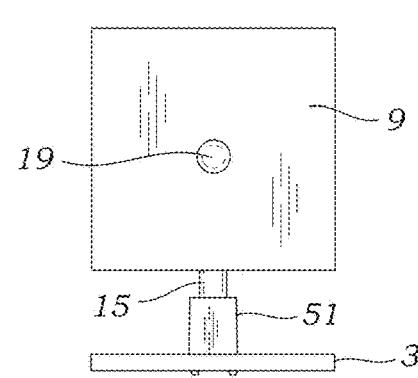
FIG. 12 is a front-side view of an electronic panel, light pipe assembly (including a light pipe with a 90° bend and an adapter), and printed circuit board, shown in FIG. 11.
Figure 13:
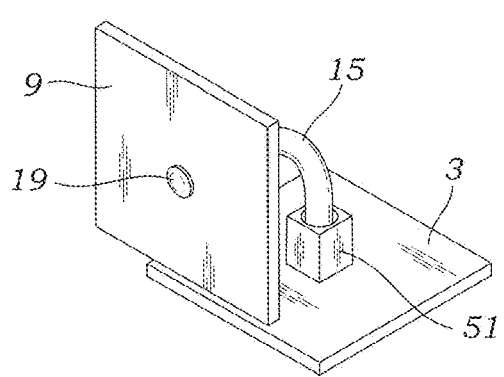
FIG. 13 is a front perspective view of an electronic panel, light pipe assembly (including a light pipe with a 90° bend and an adapter), and printed circuit board, shown in FIG. 11.
Figure 14:
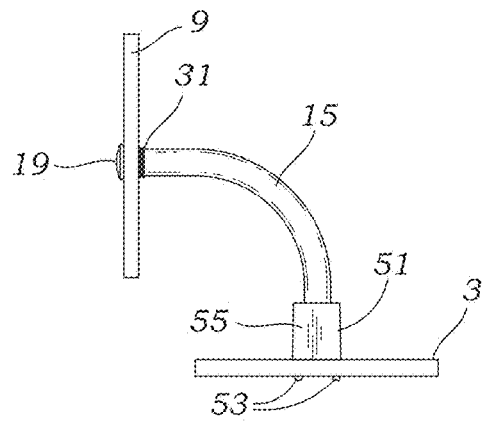
FIG. 14 is a right-side view of an electronic panel, light pipe assembly (including a light pipe with a 90° bend and an adapter), and printed circuit board, shown in FIG. 11.
Figure 15:
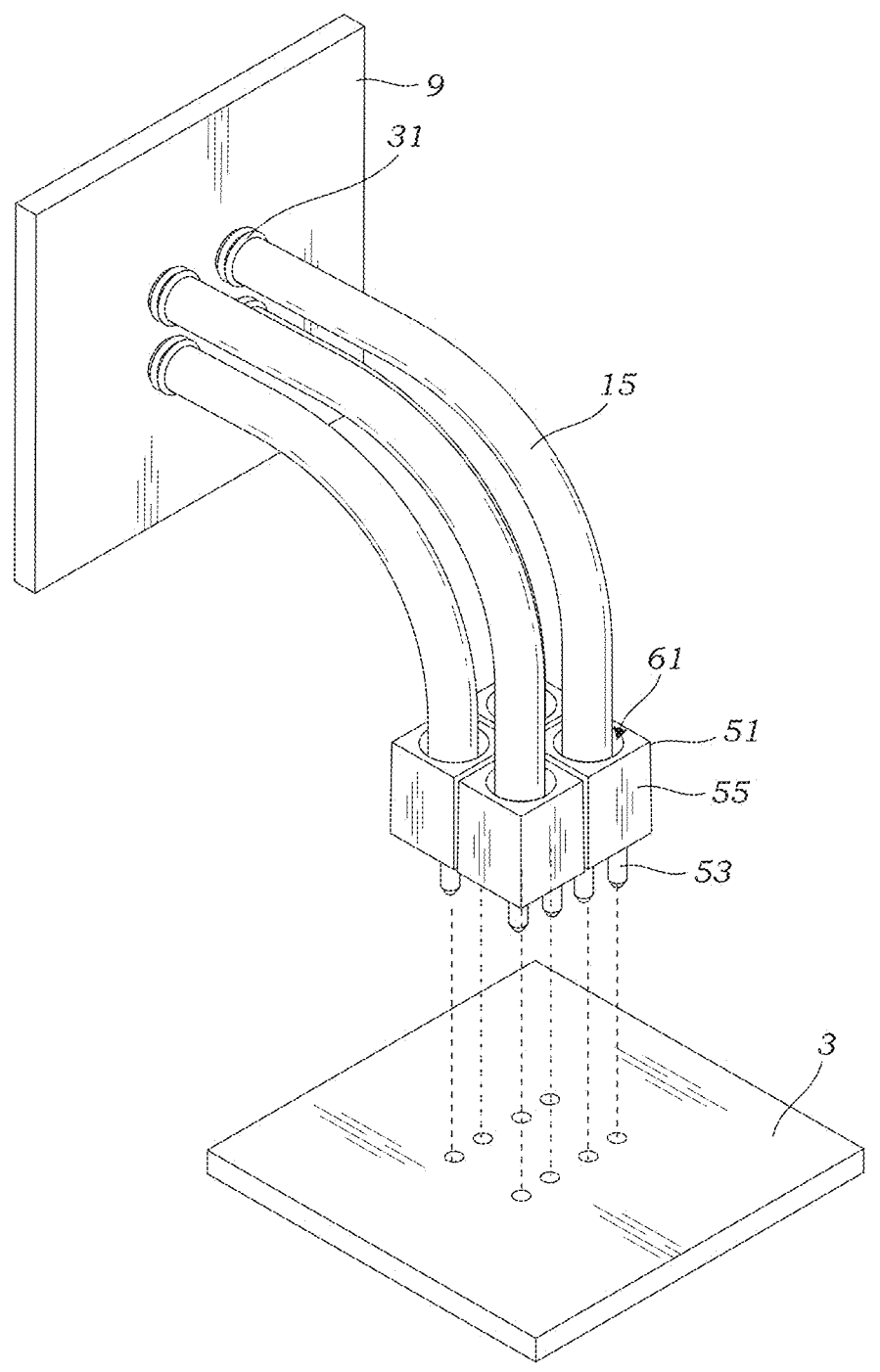
FIG. 15 is a rear partially exploded perspective view of an electronic panel, four light pipe assemblies (each including a light pipe with a 90° bend and an adapter), and printed circuit board.
Figure 16:
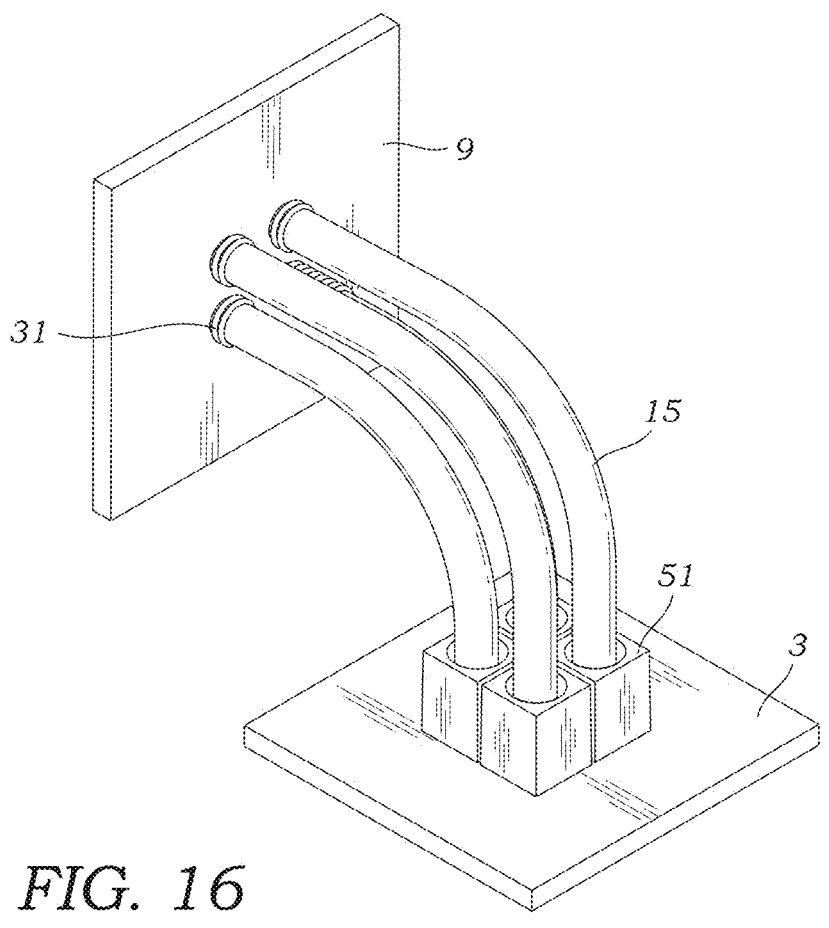
FIG. 16 is a rear non-exploded perspective view of an electronic panel, four light pipe assemblies (each including a light pipe with a 90° bend and an adapter), and printed circuit board, shown in FIG. 15.
Figure 17:
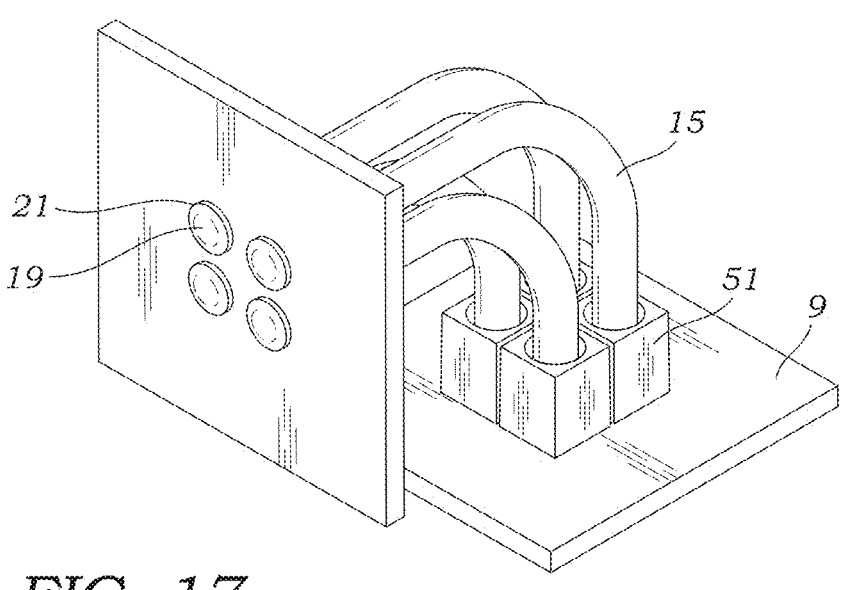
FIG. 17 is a front non-exploded perspective view of an electronic panel, four light pipe assemblies (each including a light pipe with a 90° bend and an adapter), and printed circuit board, shown in FIG. 15.

Also advantageously, the soft flexible material of the light pipe 15 allows the light pipe to be bent 90°. This flexibility allows the same light pipe 15 to be used either in a straight configuration, such as shown in FIGS. 7 and 9-10, or in a 90° bent configuration as illustrated in FIGS. 8 and 11-17.

While several particular forms of the invention have been illustrated and described, it will be apparent that various modifications can be made without departing from the spirit and scope of the invention. Accordingly, it is not intended that the invention be limited except by the following claims.

We claim:

1. A light pipe assembly comprising:
   a panel including a front side, a back side, and a hole extending through said panel from said front side to said back side;
   a circuit board including a surface mounted LED;
   an adapter mounted upon said circuit board above said LED, said adapter including a top, a bottom, and a channel extending from said top to said bottom, said channel forming a receptable;
   a light pipe made of a flexible material and including a first end, a second end, and a length between said first end and said second end, said light pipe's length having a diameter smaller than said panel's hole;
   said light pipe's first end positioned in and sized to form a press fit engagement within said adapter's receptable;
   said light pipe's second end having a flange having a diameter larger than said hole's diameter; said second end also including one or more circular ribs positioned proximal to said flange and having a diameter larger than said than said circular hole's diameter;
   said ribs being formed integrally with said light pipe so said light pipe forms a one-piece construction that extends from said adapter to said panel's front side; and
   said light pipe's second end engaging said panel with said flange positioned against said panel's front side, and said one or more ribs engaging and deforming within said circular hole to form a press-fit engagement within said circular hole.

2. The light pipe assembly of claim 1 wherein the press-fit engagement of said ribs within said circular hole forms a watertight seal that complies with the IP67 rating.

3. The light pipe assembly of claim 1 wherein said light pipe's flexible material has a Shore A hardness of below 120.

4. The light pipe assembly of claim 1 wherein said light pipe's flexible material has a Shore A hardness of between 40 and 100.

5. The light pipe assembly of claim 1 wherein said light pipe's flexible material has a Shore A hardness of between 80 and 90.

6. The light pipe assembly of claim 1 wherein said plurality of ribs includes at least one rib that resides entirely within the hole and a second rib that extends at least partially beyond said panel's back side.

* * * * *